US011663264B2

(12) United States Patent
Srinivasan et al.

(10) Patent No.: US 11,663,264 B2
(45) Date of Patent: May 30, 2023

(54) KEYWORD LOCALIZATION DIGITAL IMAGE SEARCH

(71) Applicant: Adobe Inc., San Jose, CA (US)

(72) Inventors: Pramod Srinivasan, San Francisco, CA (US); Zhe Lin, Fremont, CA (US); Samarth Gulati, Chandigarh (IN); Saeid Motiian, San Francisco, CA (US); Midhun Harikumar, Santa Clara, CA (US); Baldo Antonio Faieta, San Francisco, CA (US); Alex C. Filipkowski, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 433 days.

(21) Appl. No.: 16/785,410

(22) Filed: Feb. 7, 2020

(65) Prior Publication Data
US 2021/0248177 A1    Aug. 12, 2021

(51) Int. Cl.
G06F 16/532    (2019.01)
G06F 16/583    (2019.01)
G06F 16/538    (2019.01)
G06F 40/30    (2020.01)
G06F 16/51    (2019.01)
G06F 16/54    (2019.01)

(52) U.S. Cl.
CPC ........... *G06F 16/532* (2019.01); *G06F 16/51* (2019.01); *G06F 16/538* (2019.01); *G06F 16/54* (2019.01); *G06F 16/583* (2019.01); *G06F 40/30* (2020.01)

(58) Field of Classification Search
None
See application file for complete search history.

(56) References Cited

U.S. PATENT DOCUMENTS

| 8,706,740 | B2 * | 4/2014 | Hua | G06F 16/24578 |
| | | | | 707/754 |
| 9,672,227 | B2 * | 6/2017 | Iwase | G06F 16/532 |
| 2002/0071615 | A1 * | 6/2002 | Kobayashi | G06F 16/58 |
| | | | | 707/E17.026 |
| 2015/0324394 | A1 * | 11/2015 | Becker | G06F 16/5838 |
| | | | | 707/733 |
| 2019/0121879 | A1 * | 4/2019 | Canelis | G06F 3/04817 |

OTHER PUBLICATIONS

Veltkamp, R.—"Content-Based Image Retrieval Systems: A Survey"—Oct. 2000, pp. 1-49 (Year: 2000).*
Chowdhury, S.—"VISIR: Visual and Semantic Image Label Refinement"—WSDM—Feb. 2018, pp. 117-125 (Year: 2018).*
(Continued)

*Primary Examiner* — Bernard Krasnic
(74) *Attorney, Agent, or Firm* — FIG. 1 Patents

(57) ABSTRACT

Keyword localization digital image search techniques are described. These techniques support an ability to indicate "where" a corresponding keyword is to be expressed with respect to a layout in a respective digital image resulting from a search query. The search query may also include an indication of a size of the keyword as expressed in the digital image, a number of instances of the keyword, and so forth. Additionally, the techniques and systems as described herein support real time search through use of keyword signatures.

20 Claims, 11 Drawing Sheets

(56) References Cited

OTHER PUBLICATIONS

"Concept Canvas", Retrieved at: https://research.adobe.com/news/concept-canvas/, Feb. 17, 2017, 1 page.
Shutterstock,"Use Shutterstock's New Composition Aware Search to Find the Perfect Image, Faster", Retrieved at: https://www.shutterstock.com/blog/composition-aware-search-tool, Oct. 12, 2017, 5 pages.
Wang,"Concept Mask: Large-Scale Segmentation from Semantic Concepts", Aug. 18, 2018, 32 pages.
Zhang,"Top-down Neural Attention by Excitation Backprop", In European Conference on Computer Vision, Aug. 2016, 21 pages.

* cited by examiner

800

802
Generate an attention map corresponding to a keyword based on a digital image, the attention map indicating contribution of spatial locations in the digital image towards presence of the keyword

804
Generate a segmentation mask based on the attention map, the segmentation mask indicating spatial locations corresponding to the keyword in the digital image

806
Generate an indication of a location indicating which predefined portion of a plurality of predefined portions defining a layout corresponds to the keyword in the digital image

808
Generate a location score

810
Generate a keyword mask

812
Generate a keyword signature including the indication and the keyword, the keyword signature supporting a location aware keyword search based on the indication and the keyword

*Fig. 8*

KEYWORD LOCALIZATION DIGITAL IMAGE SEARCH

BACKGROUND

Digital image search may be used to support a user-initiated search of millions of digital images in real time by an image search system in ways that are not possible to be performed by a human being. In one conventional example, an image search system may receive a search query that includes a keyword, such as "dog." The image search system then locates digital images from the millions of digital images that are tagged using the keyword and includes these in the search result. Thus, while conventional systems may support a real time search of millions of digital images, conventional systems are limited by a user's ability to express what is desired in a digital image and how this expression matches tags used by other parties to express what is contained in the digital images.

As such, conventional image search systems suffer from numerous challenges that are both user inefficient as well as computationally and network inefficient. Continuing with the previous example, a multitude of digital images may include a "dog" but include numerous differences in how the dog is depicted, few of which are desirable to a user that initiated the search. A user, for instance, may desire a particular number of dogs, a location of the dog, size of the dog within the digital image, and so forth. However, conventional image search systems do not support an ability to localize keywords in a digital image, especially when confronted with millions of digital images to support real time output of a search result.

SUMMARY

Keyword localization digital image search techniques are described. These techniques support an ability to indicate "where" a corresponding keyword is to be expressed with respect to a layout in a respective digital image resulting from a search query through use of a plurality of predefined portions that define a spatial layout. The search query may also include an indication of a size of the keyword as expressed in the digital image, a number of instances of the keyword, and so forth. Additionally, the techniques and systems as described herein support real time search through use of keyword signatures that improve data storage efficiency and processing in order to perform a search.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 8 is a flow diagram depicting a procedure in an example implementation of keyword generation.

DETAILED DESCRIPTION

Overview

Figure 1:
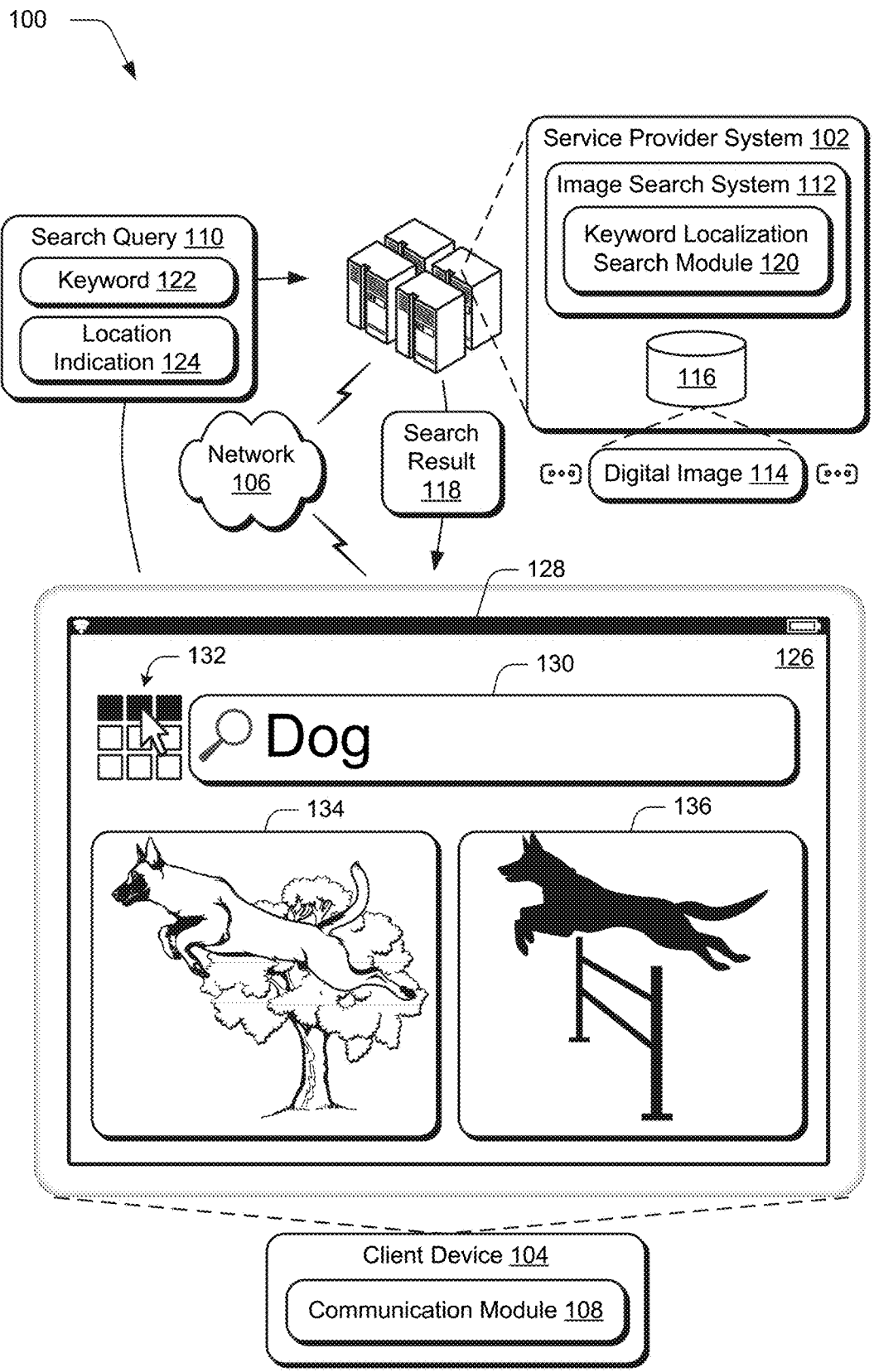
FIG. 1 is an illustration of an environment in an example implementation that is operable to employ keyword localization digital image search techniques described herein.

Conventional digital image search techniques rely on matching keywords of a search query to tags associated with digital images. Consequently, conventional techniques are incapable of addressing a variety of characteristics that are related to these keywords but are difficult to express using text. Examples of these characteristics include a location of the keyword in the digital image (e.g., where the keyword is expressed in the digital image), size of an area corresponding to the keyword, a number of instances of the keyword in the digital image, and so forth. Accordingly, conventional techniques may require multiple user interactions which cause user frustration and inefficient utilization of computational and network resources.

Accordingly, keyword localization digital image search techniques are described. These techniques support an ability to indicate "where" a corresponding keyword is to be expressed in a respective digital image resulting from a search query. The search query may also include an indication of a size of the keyword as expressed in the digital image, a number of instances of the keyword, and so forth. Additionally, the techniques and systems as described herein support real time search through use of keyword signatures that improve data storage efficiency and processing in order to perform a search.

In one example, a keyword signature system of an image search system is configured to generate keyword signatures for respective digital images that support real time digital image search localization, size, and number of instances. To begin, a digital image and keyword are received by the keyword signature system. The keyword signature system then generates an attention map, which indicates a contribution of spatial locations in the digital image towards presence of the keyword, e.g., through use of a convolutional neural network using machine learning. This may be performed to generate a plurality of attention maps, such as for different sizes/resolutions, e.g., 10×10, 16×16, and so forth.

The attention maps are then processed by the keyword signature system to generate a segmentation mask. The segmentation mask indicates spatial locations corresponding to the keywords in the digital image. The segmentation mask, for instance, may tag pixels in the digital image using respective keywords, e.g., is a pixel-wise mask for each keyword in the digital image.

The segmentation mask is then used by the keyword signature system to generate an indication of a location of the keyword within the digital image that consumes less data, e.g., in comparison with storing correlations between tags and pixels of the segmentation mask. This is performed through use a spatial layout that is defined using a plurality of predefined portions that define a spatial layout of the digital image. In this way, the definition of the spatial layout using the plurality of predefined portions may reduce an amount of memory used as part of the keyword signature and support real time operation as further described below.

To do so, the indication of the location may leverage the spatial layout in a variety of ways. In one example, the indication is configured as a location score. The location score includes an activation for each predefined portion of the plurality of predefined portions. The activation indicates an amount that a respective predefined portion of a layout that corresponds to a respective keyword. The layout, for instance, may be configured as a grid from the predefined portions, such as a three-by-three grid. Each of these predefined portions includes an associated activation for the keyword, e.g., an amount of the predefined portion that corresponds to the keyword. In this way, location score may express localization of the keyword using a lesser amount of data with increased richness over the segmentation mask which indicates for each pixel whether the pixel does or does not represent the keyword.

In another example of an indication, a keyword mask is used. The keyword mask includes binary indications (e.g., 1 for inclusion, 0 for not included) of whether a respective predefined portion of a plurality of predefined portions of a layout includes the keyword. The keyword mask, for instance, may include a layout as a grid having a plurality of predefined portions, a number of predefined portions which may be greater (e.g., has a greater resolution) than the location score, e.g., 8×8. This may be used, for instance, to define and leverage an overall shape in the digital image that represents the keyword. Thus, in both instances the location score and the keyword mask include predefined portions representing a plurality of pixels and thus reduces overall size of the data to provide this representation with respect to the segmentation mask and promotes real time operation as further described below.

The keyword signature system then generates the keyword signature to represent the digital image as including the keyword and the indication, e.g., the location score and/or the location mask. The keyword signature system may also specify additional characteristics of representation of the keyword in the digital image. This may include a location count, such as a number of instances of the keyword in the digital image, e.g., to capture a number of dogs in the digital image. In another example, a location size is included as part of the keyword signature, such as a size of characteristics representing the keyword in the digital image, e.g., with respect to the digital image as a whole. In this way, the keyword signatures may support real time digital image search with increased computational efficiency. In one real world example, for instance, eighteen thousand keywords and a corresponding 125 million digital images are used as a basis to generate 3.7 billion keyword signatures resulting in an 81% storage reduction (from 5.2 Petabytes of the segmentation masks) in storage devices and supports real time search execution (e.g., 144 millisecond average).

Therefore, in order to perform a search in one example, a user interface is output by a client device. The user interface includes a representation of a layout having a plurality of predefined portions and a keyword input section. The predefined portions are user selectable to indicate a desired location within the spatial layout, at which, the keyword is to be represented in a digital image resulting from an image search. The predefined portions may also be used to indicate a size of the representation of the keyword as well as a number of instances of the keyword. This may be performed for single or multiple keywords to generate a search query that includes the keyword and a corresponding location indication, size, number of instances, and so on.

The search query is then received by an image search system, e.g., remotely via a network or locally at the client device itself. The search query is used to search a plurality of digital images using respective keyword signatures. The search query, for instance, may be processed by the image search system to generate a query location indication. The query location indication includes a positive mask indicating a desired location of the representation of the keyword and a negative mask indicating locations of the representation of the keyword that are not desired. In this way, the image search system may support increased accuracy, e.g., to address digital image having multiple instances such as a litter of dogs in a situation in which a single dog is desired.

The image search system, for instance, may begin with a keyword search to locate a subset of keyword signatures of digital images based on the keyword. The image search system may then evaluate the keyword signatures to compare the indication (e.g., query location indication) of the search query with the location indications of the keyword signatures, e.g., the keyword mask and/or location score. This may be used to score and rank the subset, which may include other characteristics such as size (e.g., a number of predefined portions of the layout of the keyword signature as corresponding to a size of the indication), number of instances, and so on. In this way, the techniques described herein support keyword localization that also supports size and number of instances as part of the image search with increased efficiency over conventional techniques.

In the following discussion, a Digital Medium Environment is first described that is configured to implement the keyword localization techniques described herein. A Keyword Signature Generation section then follows that describes generation of keyword signatures that support real time keyword localization searches that also support size and number of instances. A Keyword Digital Image Search Localization follows that describes use of the keyword signatures as part of a digital image search. Example procedures are also described which may be performed in the example environments as well as other environments. Consequently, performance of the example procedures is not limited to the example environment and the example environment is not limited to performance of the example procedures.

Digital Medium Environment

FIG. 1 is an illustration of a digital medium keyword location digital image search environment 100 in an example implementation that is operable to employ techniques described herein. The illustrated environment 100 includes a service provider system 102 and client device 104 that are communicatively coupled via a network 106. Computing devices that implement the service provider system 102 and the client device 104 may be configured in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown and described in instances in the following discussion, a computing device may be representative of a plurality of different devices, such as multiple servers utilized by a business to perform operations "over the cloud" as described in FIG. 11.

The client device 104 includes a communication module 108 that is configured to initiate a search query 110. The communication module 108, for instance, may be configured as a browser, a network-enabled application, and so forth. The search query 110 is communicated in the illustrated example over the network 106 for receipt by an image search system 112 of a service provider system 102. Although the image search system 112 is illustrated separately from the client device 104, functionality of the image search system 112 may also be implemented, in whole or in part, locally at the client device 104.

The image search system 112, in response to the search query 110, searches a plurality of digital images 114 (e.g., which are illustrated as maintained in a storage device 116) to generate a search result 118. The search result 118 includes a subset of the digital images 114 that are communicated back to the client device 104 via the network 106 for output to and rendering by the client device 104. In this way, the image search system 112 may support an image search in real time of millions of digital images, e.g., over 125 million, which is not possible to be performed by a human being.

A variety of techniques may be implemented to support a digital image search. Conventional techniques are limited as previously described to keyword searches in which keywords are matched to image tags and as such lack accuracy. In the techniques described herein, however, a keyword localization search module 120 is employed to localize keywords within representative predefined portions of a digital image 114. The localization techniques described herein may support real time search as well as other search functionality, including size, number of instances, and use positive and negative masks to improve accuracy and computational performance over conventional search techniques.

To do so, a search query 110 is formed by the communication module 108 that includes a keyword 122 and a location indication 124 as to "where" in a digital image the keyword is to be represented. The keyword 122, for instance, may describe a name of an object, a semantic keyword (e.g., which may include a feeling invoked by a representative predefined portion such as happy, sad), and so forth. The keyword localization search module 120 generates the search result 118 to include a subset of the digital images 114 that includes the keyword 122 at the corresponding location in accordance with the location indication 124.

As illustrated by the client device 104, for instance, a user interface 126 is output by a display device 128. The user interface 126 includes an option 130 to enter a keyword, which is "dog" in this example. The user interface 126 also includes a representation 132 of a layout having a plurality of predefined portions that are user selectable. The predefined portions form the layout in the illustrated example as a grid having rows and columns. Any other layout is also contemplated that is usable to specify a location with respect to a digital image.

A user input, for instance, may be received (e.g., via cursor control device in the illustration) as selecting corresponding predefined portions of the representation 132 of the layout, which are illustrated in black in this example with unselected predefined portions being white. By selecting different predefined portions of the layout within the representation 132, a user may specify a location at which the desired keyword is to be expressed as well as a size of this expression, e.g., by selecting one or multiple predefined portions. Other examples are also contemplated, such as layouts other than a grid, a free form input in which a user input is received as drawing over a corresponding location of a layout, and so forth.

In the illustrated example, for instance, the top three predefined portions of the layout are selected as the location indication 124 by a cursor control device that are to correspond to the keyword 122 of the search query 110. Accordingly, the keyword localization search module 120 then searches the digital images 114 based on the search query 110 to generate a search result 118. Examples of digital images 134, 136 included in the search result 118 are illustrated as rendered in the user interface 126 by the display device 128. In each of these example digital images 134, 136, the keyword (e.g., dog) is represented along predefined portions of the digital image that corresponding to the location indication 124 and further has a size consistent with that indication. In this way, the keyword localization search module 120 may support increased functionality over conventional digital image search techniques by localizing the keyword. In the following section, generation of keyword signatures is first described to support digital image search with increased efficiency which is then followed by an example of performing a digital image search.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Keyword Signature Generation

Figure 2:
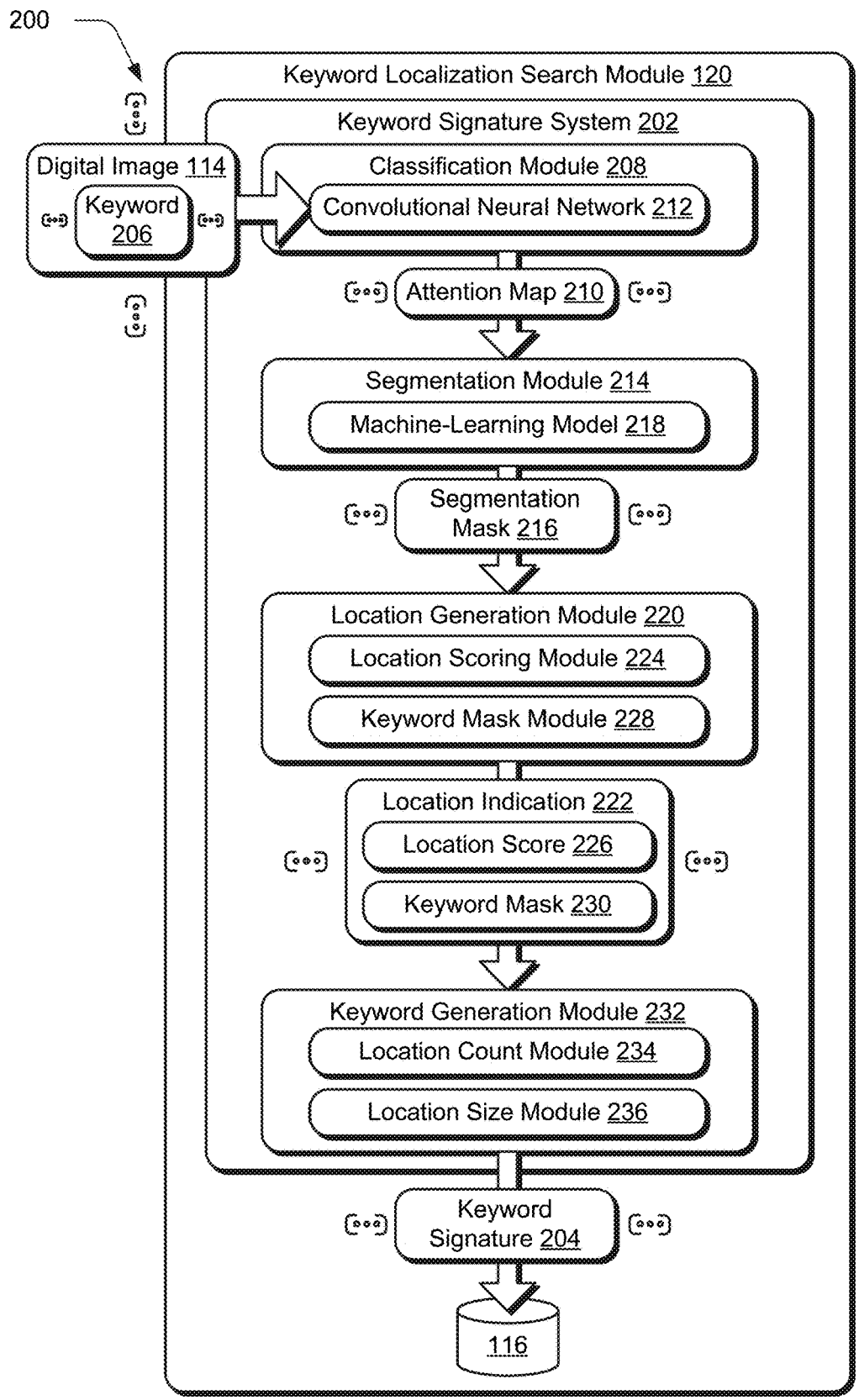
FIG. 2 depicts a system in an example implementation of generating a keyword signature from a digital image and associated keyword to support keyword localization as part of a digital image search.
Figure 3:
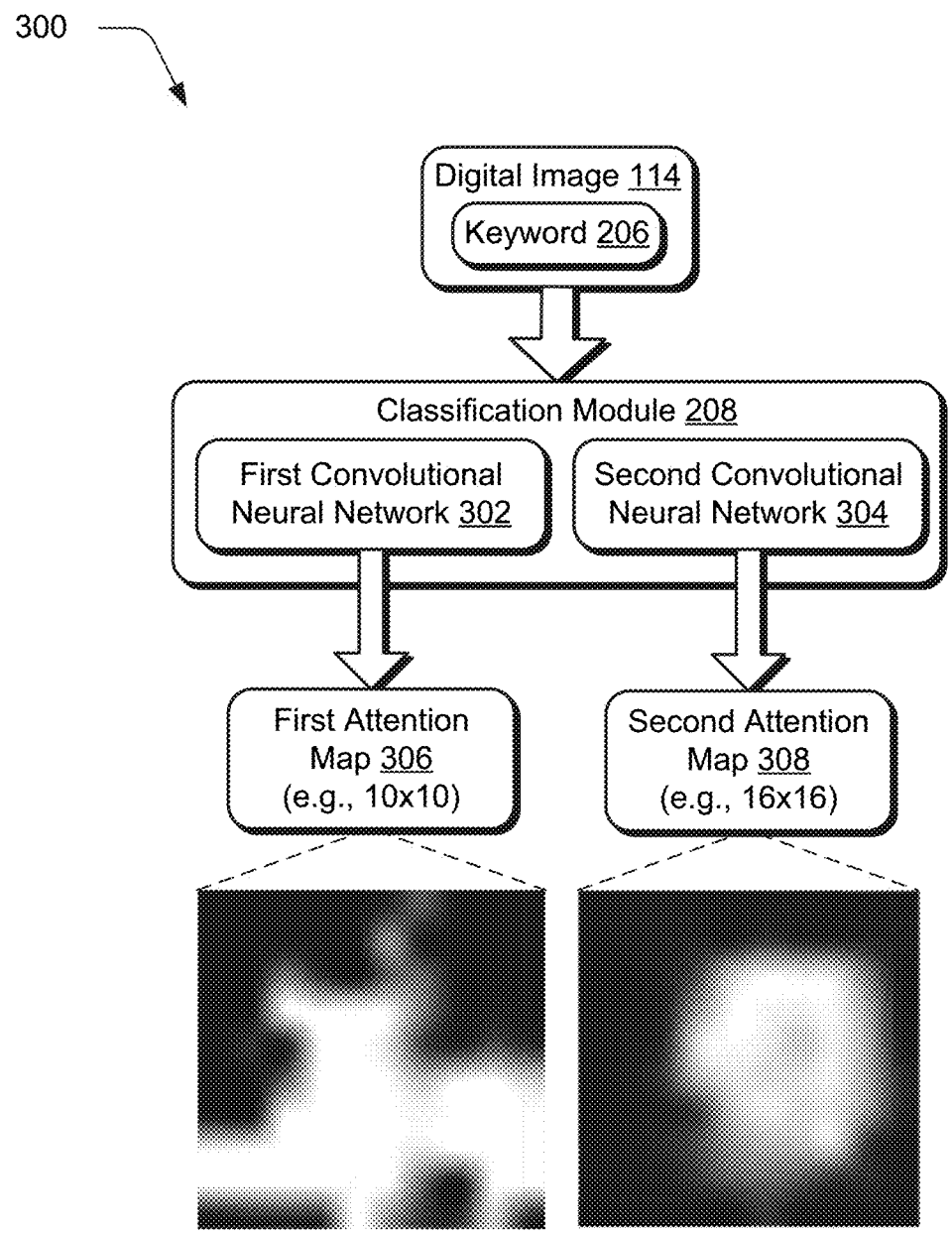
FIG. 3 depicts a system in an example implementation showing operation of a classification module to generate attention maps from a digital image and associated keyword.
Figure 4:
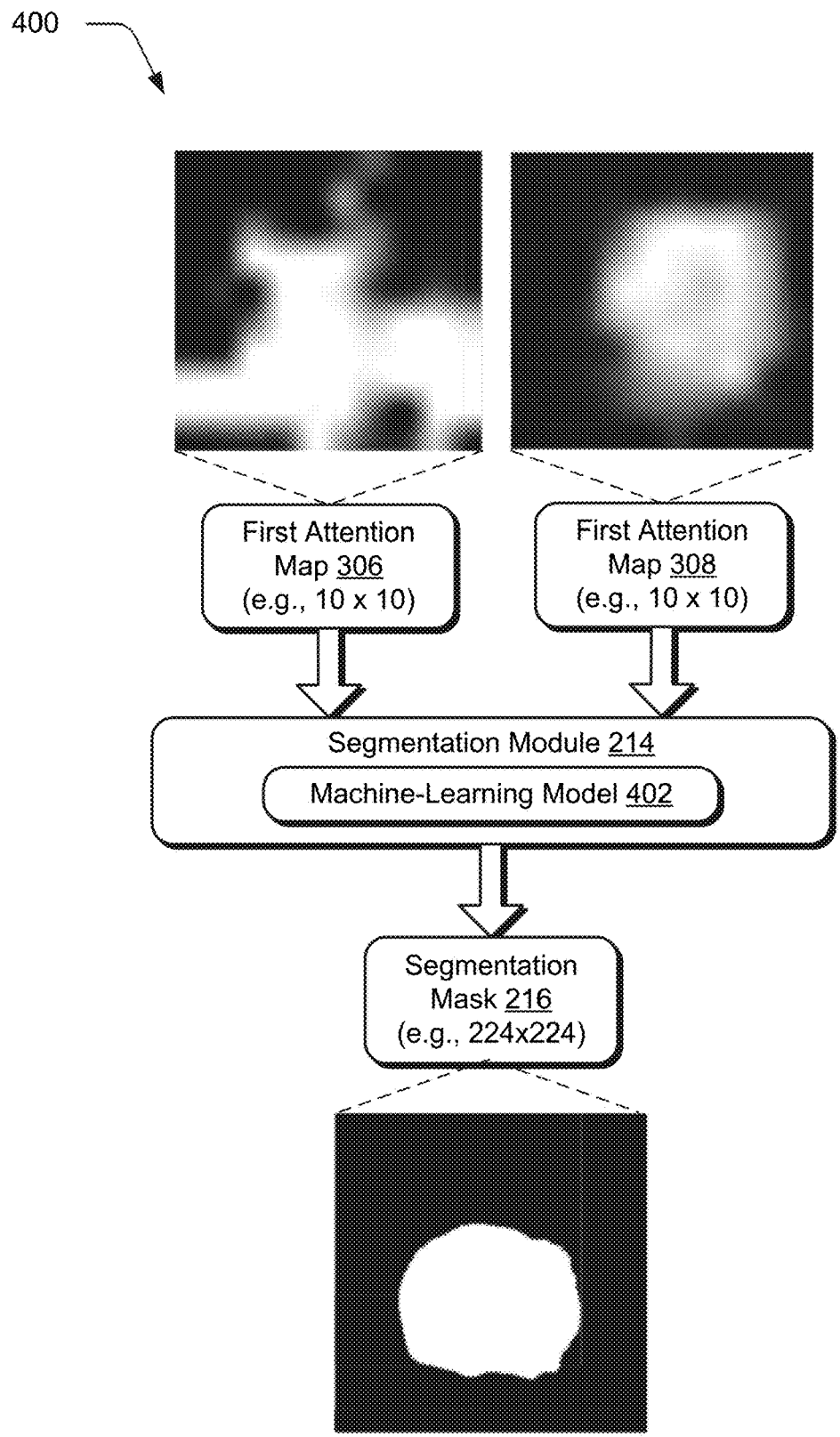
FIG. 4 depicts a system in an example implementation showing operation of a segmentation module to generate a segmentation mask from the attention maps of FIG. 3.
Figure 5:
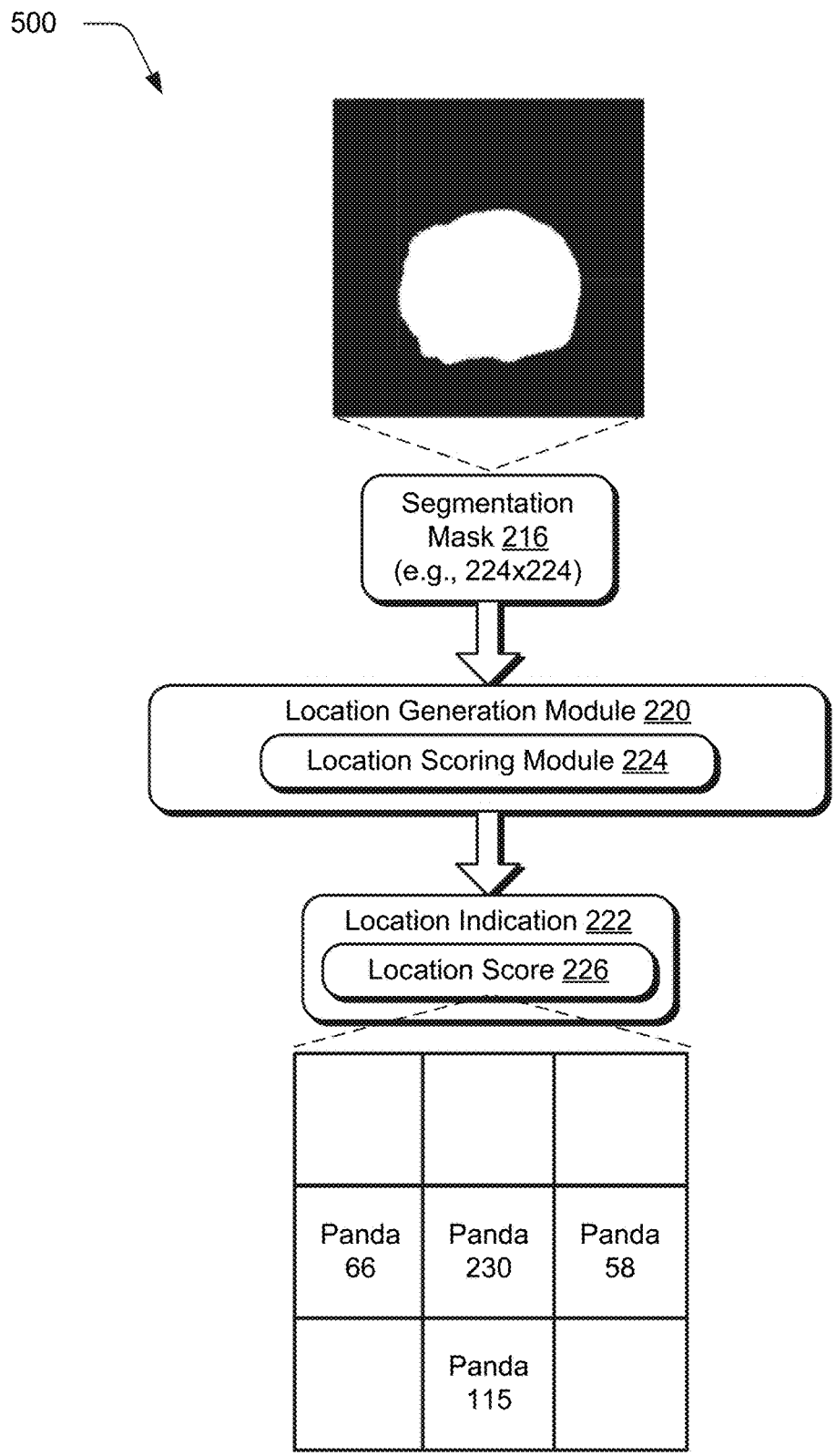
FIG. 5 depicts a system in an example implementation showing operation of a location generation module to generate a location indication as a location score based on the segmentation mask of FIG. 4.
Figure 6:
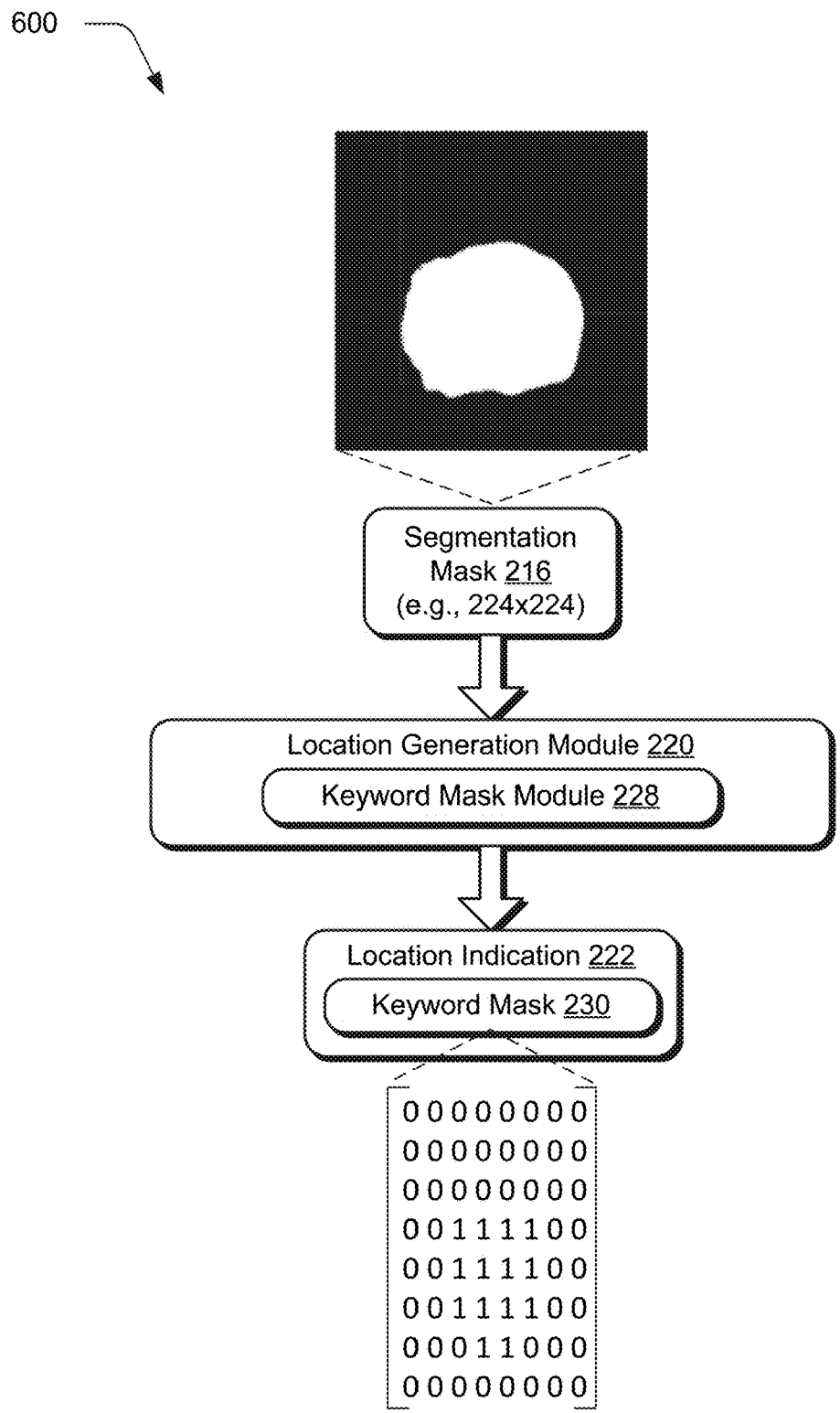
FIG. 6 depicts a system in an example implementation showing operation of a location generation module to generate a location indication as a keyword mask based on the segmentation mask of FIG. 4.
Figure 7:
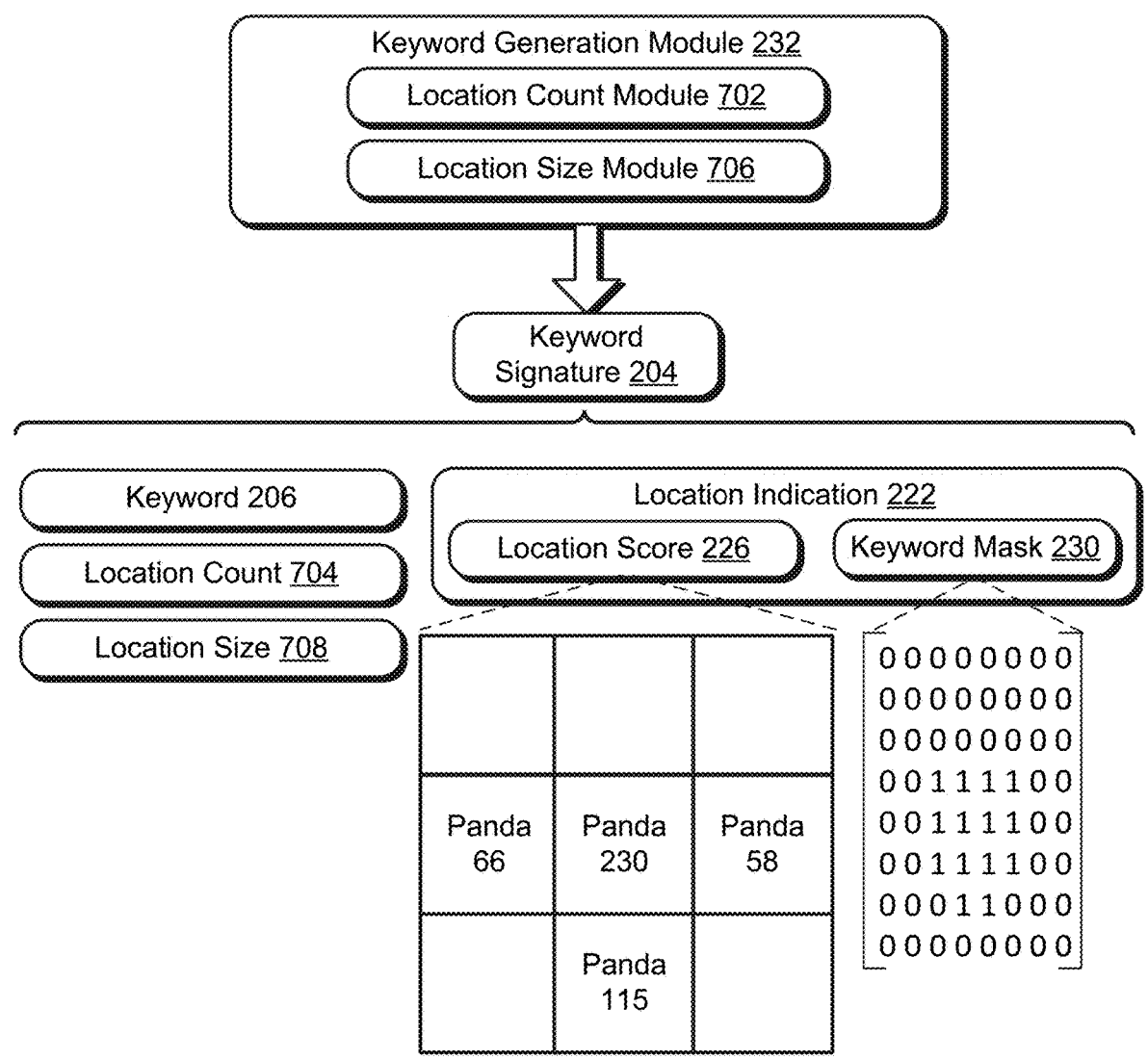
FIG. 7 depicts a system in an example implementation of generating a keyword signature based on the location indication and the keyword.

FIG. 2 depicts a system 200 in an example implementation of generating a keyword signature from a digital image and associated keyword to support keyword localization as part of a digital image search. FIG. 3 depicts a system 300 in an example implementation showing operation of a classification module to generate attention maps from a digital image and associated keyword. FIG. 4 depicts a system 400 in an example implementation showing operation of a segmentation module to generate a segmentation mask from the attention maps of FIG. 3. FIG. 5 depicts a system 500 in an example implementation showing operation of a location generation module to generate a location indication as a location score based on the segmentation mask of FIG. 4. FIG. 6 depicts a system 600 in an example implementation showing operation of a location generation module to generate a location indication as a keyword mask based on the segmentation mask of FIG. 4. FIG. 7 depicts a system 700 in an example implementation of generating a keyword signature based on the location indication and the keyword. FIG. 8 depicts a procedure 800 in an example implementation of keyword generation.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In predefined portions of the following discussion, reference will be made interchangeably to FIGS. 2-8.

In this example, the keyword localization search module 120 employs a keyword signature system 202 to generate keyword signatures 204 for the digital images 114 that are to be searched. The keyword signatures 204 are configured to support digital image search localization with efficient use of memory and processing resources to support real time digital image search.

To do so, the keyword signature system 202 receives a plurality of digital images 114 (e.g., 125 million) and associated keywords 206, e.g., eighteen thousand. The digital images 114 may each include multiple keywords 206 and thus a keyword signature 204 may be generated for each keyword and digital image combination. This may be performed, for instance, for a top number of keywords in each digital image, e.g., forty.

The digital image 114 and corresponding keyword 122 are passed as an input to a classification module 208 to generate an attention map 210 as corresponding to the keyword 206 based on the digital image 114. The attention map 210 indicates a contribution of spatial locations in the digital image 114 towards presence of the keyword 206 (block 802), e.g., through use of a convolutional neural network 212. The attention map 210, for instance, may be configured as a scalar matrix that represents relative importance of activations within layers of the neural network toward representation of the keyword 206. This may be performed by the classification module 208 to generate a single attention map or multiple attention maps for each digital image 114 and keyword 206 combination.

As illustrated in the example system 300 of FIG. 3, for instance, the classification module 208 includes a first convolutional neural network 302 and a second convolutional neural network 304. These networks are configured to generate attention maps having different resolutions. The first convolutional neural network 302, for instance, may generate a first attention map 306 having a first resolution (e.g., 10×10) and the second convolutional neural network 304 is configured to generate a second attention map 308 having a second resolution (e.g., 16×16) greater than the first resolution. In this way, features of the digital image that contribute toward representation of the keyword may be captured in a variety of ways.

The attention map 210 is then passed from the classification module 208 as an input to a segmentation module 214 to generate a segmentation mask 216, e.g., using a machine-learning model 218 employing edge detection, clustering, Mask R-CNN, and so forth. The segmentation mask 216 indicates spatial locations corresponding to the keyword in the digital images (block 804). The segmentation mask 216, for instance, may include per-pixel labels, a 224×224 bit-mask, and so on indicating a corresponding semantic concept (e.g., the keyword 206). Therefore, the segmentation mask 216 partitions the digital image 114 into corresponding segments (i.e., sets of pixels) that are represented by the pixels.

As previously described, subsequent storage of segmentation masks for each combination of digital image and keyword may consume significant storage device resources (e.g., 5.6 Petabytes for the example above) and hinder real time operation. Accordingly, the keyword signature system 202 employs a location generation module 220 to generate a location indication 222 that consumes fewer memory resources and supports real time implementation as part of digital image search.

To do so, the indication of the location generated by the location generation module 220 indicates which predefined portion of a plurality of predefined portions defining a layout corresponds to the keyword in the digital image (block 806). Thus, in this example a defined layout is used to reduce an amount of data used to express localization, size, number of instances, and so on. This may be performed in a variety of ways.

In one example, the indication is generated by a location scoring module 224 as a location score 226 (block 808). As shown in the example system 500 of FIG. 5, for instance, a location scoring module 224 is configured to generate a location score 226 that includes an activation for each predefined portion of the plurality of predefined portions of the layout. The activation indicates an amount of the predefined portion that corresponds to the respective keyword. The activations, for instance, may be expressed as weights (e.g., 0-255) defining a percentage of the predefined portion that represents the keyword. In this way, the location score 226 may quantify an amount each predefined portion of the layout corresponds to the keyword. This may then be used as a basis for matching with corresponding predefined portions of a search query (e.g., through use of a threshold, ranking, and so on) as further described in the next section.

Figure 9:
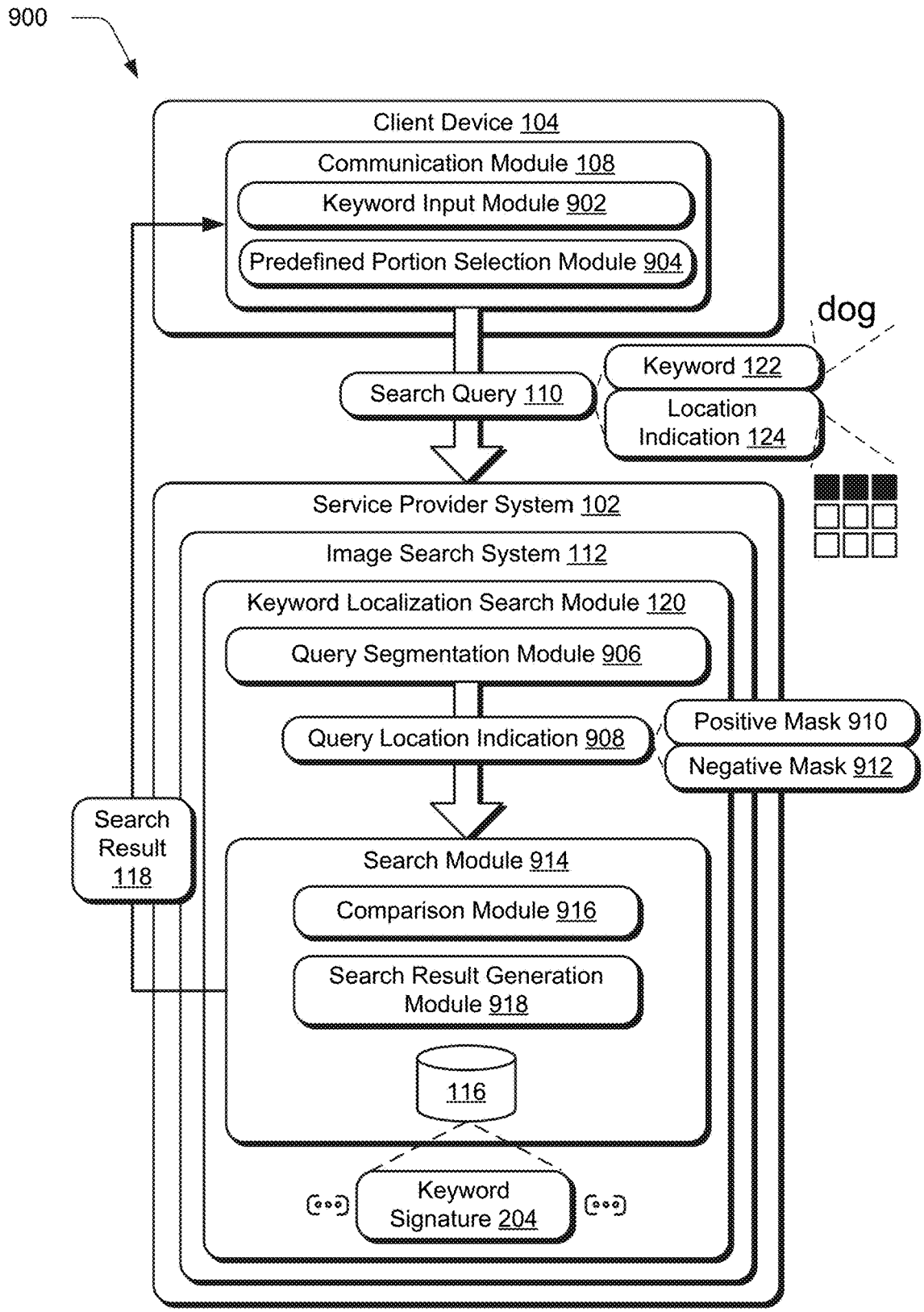
FIG. 9 depicts a system in an example implementation of a keyword localization digital image search.

In another example, the indication is generated by a keyword mask module 228 as a keyword mask 230 (block 810). The keyword mask 230 provides a high-level visualization of a location of the keyword in the image as well as a shape of the location. An example of which is illustrated in FIG. 9 as an 8×8 grid having binary indications of whether corresponding location correspond to or do not correspond to the keyword. In an implementation, resolution of the keyword mask 230 (e.g., a number of predefined portions in the layout) has a resolution that is greater than the location score 226, e.g., to provide increased resolution of shape and contours of the keyword as expressed in the digital image although other examples are also contemplated.

The location indication 222 and corresponding keyword 206 are then used as a basis by a keyword generation module 232 to generate the keyword signature 204 to support location aware keyword search (block 812) as further described in the following section. The keyword generation module 232 may also generate the keyword signature 204 to include additional elements that support increased functionality and richness in localization of the keyword within the digital image.

In a first example, a location count module 702 is employed to generate a location count 704 as part of the keyword signature 204 to define a number of separate instances of the keyword 206 that are contained within the digital image 114. This may be used, for instance, to differentiate between a single instance of a dog as illustrated in FIG. 1 versus a collection of puppies and thus supports increased accuracy in the digital image search.

In another example, a location size module 706 is employed to specify a location size 708 of representation of the keyword with respect to the digital image as a whole, e.g., a percentage of pixels of the overall digital image that correspond to the keyword. In this way, scale and count of the keyword within the digital image may be captured as used as a basis to perform a digital image search as further described in the following section.

Digital Image Search Localization

Figure 10:
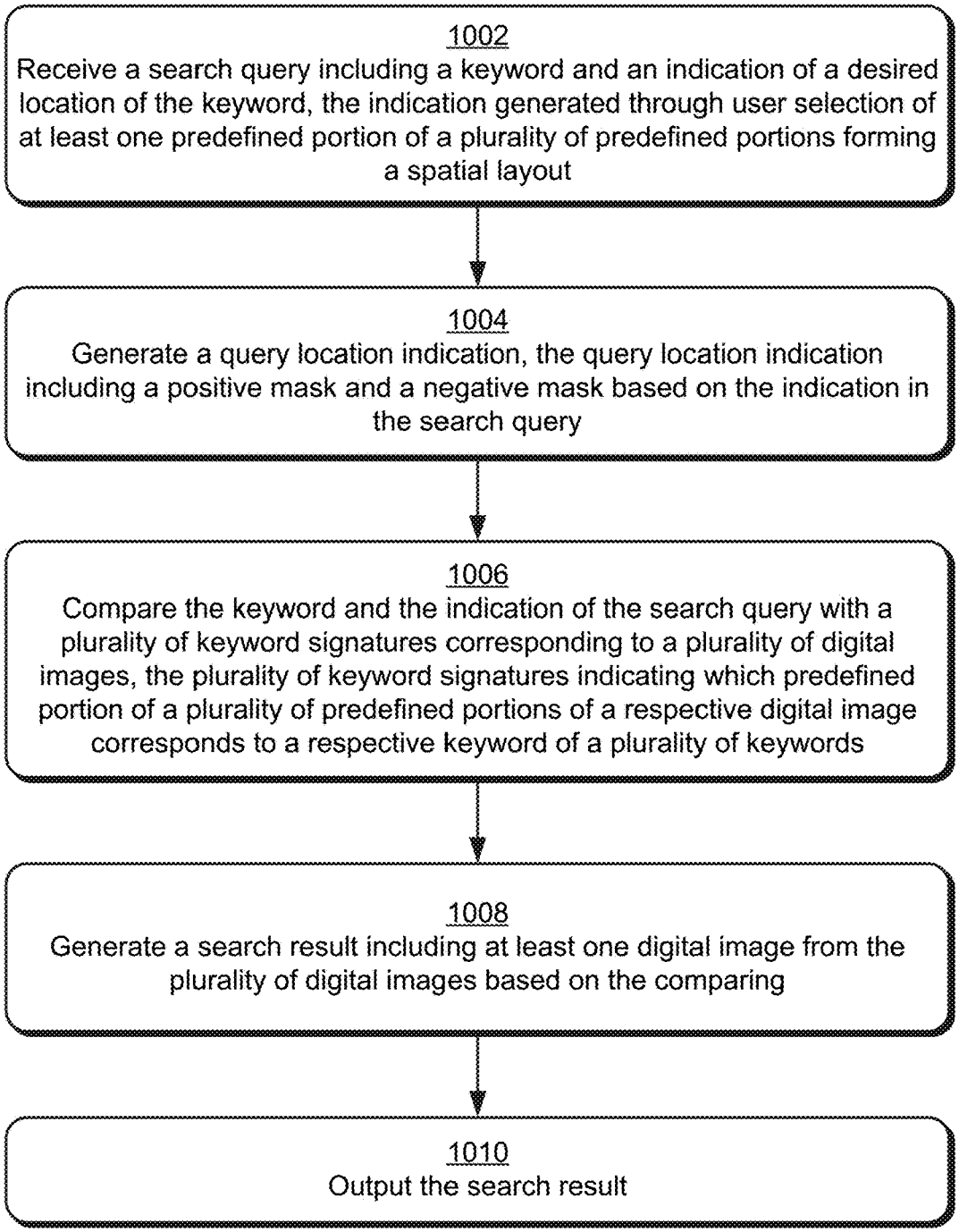
FIG. 10 depicts a procedure in an example implementation in which a search query is received including a location indication of at least one predefined portion of a plurality of predefined portions the form a spatial layout and used to generate a search result having digital images that correspond to the keyword and the localization specified by the indication.

FIG. 9 depicts a system 900 in an example implementation of a keyword localization digital image search. FIG. 10 depicts a procedure 1000 in an example implementation in which a search query is received including a location indication of at least one predefined portion of a plurality of predefined portions the form a spatial layout and used to generate a search result having digital images that correspond to the keyword and the localization specified by the indication.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1 and 9-10.

Continuing with the previous example, a search query 110 including a keyword 122 and a location indication 124 of a desired location of the keyword 122 is received, e.g., by the service provider system 102 from the client device 104. The location indication 124 is generated through user selection of at least one predefined portion of a plurality of predefined portions forming a spatial layout (block 1002). As shown in FIG. 1, for instance, a user interface 126 is rendered by a display device 128. The user interface 126 includes an option 130 generated by a keyword input module 902 useable to receive a keyword 122 and a representation 132 of a layout having a plurality of predefined portions generated by a predefined portion selection module 904.

The predefined portions are user selectable to indicate a location, at which, the keyword is to be represented in digital images in a search result. The predefined portions are also usable to specify a size of this representation and even orientation. By selecting the top three predefined portions of the representation 132 along with the corresponding keyword 122 of "dog," for instance, digital images 134, 136 are located that include a dog having that overall size and orientation, which corresponds to the dog jumping in the digital images 134, 136. This may also be used to leverage a number of instances, e.g., a single keyword/location combination, multiple keyword/location combinations in a single search query, and so on. In this way, the keyword localization techniques may expand search functionality beyond simple keyword searches and even localization to also address size and shape.

In one example, the search query 110, upon receipt by the image search system 112 is processed by a query segmentation module 906 to generate a query location indication 908. The query location indication 908 includes a positive mask 910 and a negative mask 912 based on the location indication 124 in the search query 110 (block 1004). The positive mask 910 indicates predefined portions at which the keyword is desired to be represented, e.g., the black boxes of FIG. 1. The negative mask 912, on the other hand, specifies predefined portions of the layout are not to include the keyword. In practice, this has been found to increase accuracy of a search result 118 as following a user's intent in selecting predefined portions and not selecting other predefined portions of the layout. For example, a user desiring placement of a dog on the right side of a digital image may not desire receiving a digital image in which dogs are included across an entirety of the digital image. Although the positive and negative masks are shown as generated by the image search system, these masks may also be generated by the client device 104 and included as part of the search query 110. Other examples are also contemplated, e.g., use of the positive mask 910 alone.

The keyword 122 and the location indication 124 of the search query 110 are compared by a comparison module 916 of a search module 914 with a plurality of keyword signatures 204 corresponding to a plurality of digital images 114. The plurality of keyword signatures 204 indicate which predefined portion of a plurality of predefined portions of a respective digital image 114 corresponds to a respective keyword 122 of a plurality of keywords (block 1006). A search result 118 is generated based on the comparison by a search result generation module 918 including at least one digital image from the plurality of digital images (block 1008) and is output (block 1010).

The search module 914, for instance, may first employ the comparison module 916 to locate keyword signatures 204 having a keyword 206 that corresponds to the keyword 122 in the search query 110, e.g., directly, semantically through word vector matching, and so forth. The search module 914 then generates scores based on respective amounts of correspondence between the keyword 122 and location indication 124 of the search query 110 with the location indication (e.g., location score 226 and/or keyword mask 230), location count 704, location size 708, and so on. The scores are then used to rank the digital images and based on this generate and output the search result 118. In this way, the techniques described herein may overcome the challenges of conventional systems and improve operational and storage efficiency through use of keyword signatures.

Example System and Device

Figure 11:
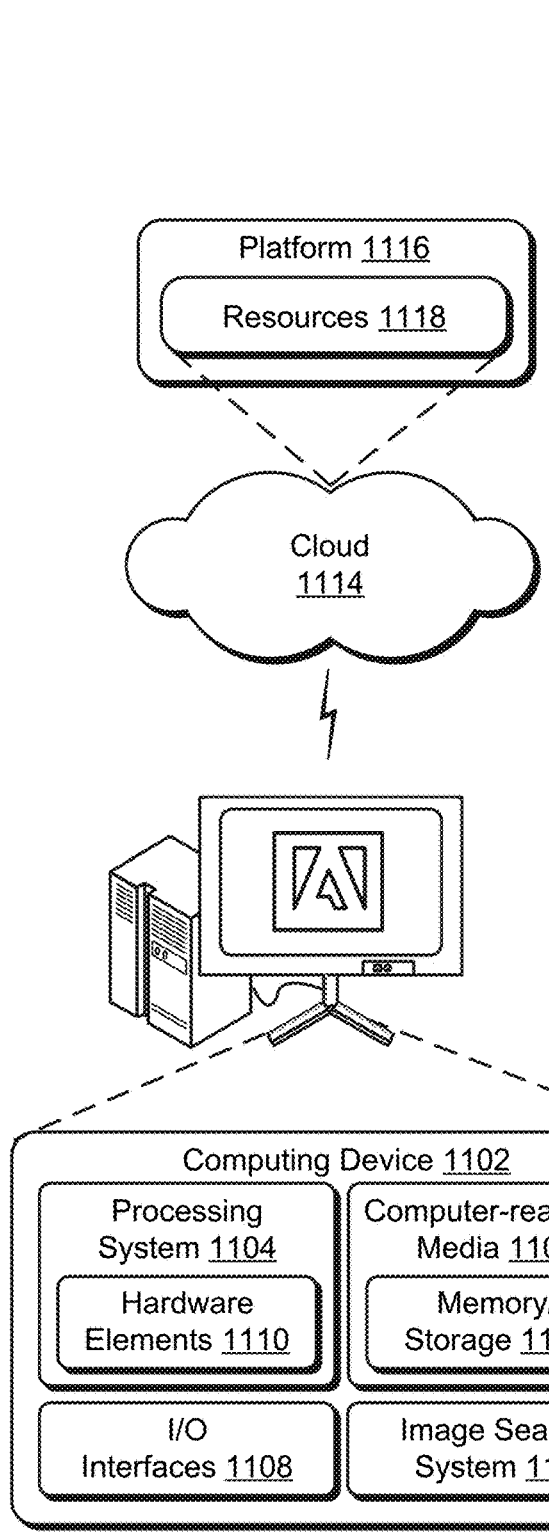
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the image search system 112. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    receiving, by the computing device, a search query including a keyword and an indication of a desired location of the keyword, the indication generated through user selection of at least one predefined portion of a plurality of predefined portions forming a spatial layout displayable in a user interface in which individual portions of the plurality of portions are user selectable, the plurality of predefined portions is disposed proximal to a portion of the user interface configured to enter a keyword, the plurality of predefined portions together having a height corresponding to a height of the portion of the user interface configured to enter the keyword;
    comparing, by the computing device, the keyword and the indication of the search query with a plurality of keyword signatures corresponding to a plurality of digital images, the plurality of keyword signatures indicating which of the plurality of predefined portions forming a spatial layout of a respective said digital image corresponds to a respective keyword of a plurality of keywords;
    generating, by the computing device, a search result including at least one digital image from the plurality of digital images based on the comparing; and
    outputting, by the computing device, the search result.

2. The method as described in claim 1, wherein the plurality of predefined portions form a grid.

3. The method as described in claim 1, wherein the plurality of predefined portions form a grid, one to another, as the spatial layout in which entireties of the respective said predefined portions are selectable via the user interface.

4. The method as described in claim 1, further comprising:
    generating a positive mask based on the indication, the positive mask indicating the at least one predefined portion at which the keyword is to be located; and
    generating a negative mask based on the indication, the negative mask indicating at least one other predefined portion of the plurality of predefined portions at which the keyword is not to be located.

5. The method as described in claim 1, wherein the keyword is a semantic keyword or a name of an object.

6. The method as described in claim 1, wherein the plurality of keyword signatures includes, respectively, an indication of a size of an area within the respective said digital image that corresponds to the respective keyword.

7. The method as described in claim 6, wherein the size is indicated as an amount of the respective said digital image that corresponds to the respective keyword.

8. The method as described in claim 6, wherein the search query indicates a size through user selection of a number of the plurality of predefined portions via a user interface.

9. The method as described in claim 1, wherein the plurality of keyword signatures includes, respectively, an indication of a number of instances of the respective keyword within the respective said digital image.

10. The method as described in claim 1, wherein the plurality of keyword signatures indicates which of the plurality of predefined portions of the respective said digital image corresponds to a respective keyword of the plurality of keywords using a location score.

11. The method as described in claim 10, wherein the location score includes an activation for each predefined portion of the plurality of predefined portions indicating an amount the predefined portion corresponds to the respective keyword.

12. The method as described in claim 1, wherein the plurality of keyword signatures indicates which of the plurality of predefined portions of the respective said digital image corresponds to the respective keyword of the plurality of keywords using a keyword mask.

13. The method as described in claim 12, wherein the keyword mask includes binary indications of whether a respective said predefined portion of the plurality of predefined portions includes the keyword.

14. A system comprising:
    means for receiving a search query including a keyword and an indication of a desired location of the keyword, the indication generated through user selection of at least one predefined portion of a plurality of predefined portions forming a spatial layout;
    means for comparing the keyword and the indication of the search query with a plurality of keyword signatures corresponding to a plurality of digital images, the plurality of keyword signatures indicating which of a plurality of predefined portions of a spatial layout of a respective said digital image corresponds to a respective keyword of a plurality of keywords using a keyword mask, the keyword masking including binary indications of whether a respective said predefined portion of the plurality of predefined portions includes the keyword; and means for generating a search result including at least one digital image from the plurality of digital images based on an output of the comparing means.

15. The system as described in claim 14, wherein: each of the plurality of keyword signatures includes, respectively:

an indication of a size of an area within the respective said digital image that corresponds to the respective keyword;

an indication of a number of instances of the respective keyword within the respective said digital image; and the indication of which predefined portion of the plurality of predefined portions of the respective said digital image corresponds to the respective keyword includes a location score indicating an activation for each predefined portion of the plurality of predefined portions indicating an amount of the predefined portion that corresponds to the respective keyword.

16. A method implemented by a processing device, the method comprising:

receiving, by the processing device, a search query including a keyword and an indication of a desired location of the keyword, the indication generated through user selection of at least one predefined portion of a plurality of predefined portions forming a spatial layout;

comparing, by the processing device, the keyword and the indication of the search query with a plurality of keyword signatures corresponding to a plurality of digital images, the plurality of keyword signatures indicating which of a plurality of predefined portions of a spatial layout of a respective said digital image corresponds to a respective keyword of a plurality of keywords using a keyword mask, the keyword masking including binary indications of whether a respective said predefined portion of the plurality of predefined portions includes the keyword; and generating, by the processing device, a search result including at least one digital image from the plurality of digital images based on the comparing.

17. The method as described in claim 16, wherein each of the plurality of keyword signatures includes, respectively, an indication of a size of an area within the respective said digital image that corresponds to the respective keyword.

18. The method as described in claim 16, wherein each of the plurality of keyword signatures includes, respectively an indication of a number of instances of the respective keyword within the respective said digital image.

19. The method as described in claim 16, wherein the indication of which predefined portion of the plurality of predefined portions of the respective said digital image corresponds to the respective keyword includes a location score indicating an activation for each predefined portion of the plurality of predefined portions indicating an amount of the predefined portion that corresponds to the respective keyword.

20. The method as described in claim 16, wherein the plurality of predefined portions is disposed proximal to a portion of a user interface configured to enter a keyword, the plurality of predefined portions together having a height corresponding to a height of the portion of the user interface configured to enter the keyword.

* * * * *